US009571417B2

(12) United States Patent
Liu et al.

(10) Patent No.: US 9,571,417 B2
(45) Date of Patent: Feb. 14, 2017

(54) PROCESSING RESOURCE ACCESS REQUEST IN NETWORK

(71) Applicant: International Business Machines Corporation, Armonk, NY (US)

(72) Inventors: Tian Cheng Liu, Beijing (CN); Baohua Yang, Beijing (CN); Yue Zhang, Beijing (CN); Kai Zheng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 14/595,444

(22) Filed: Jan. 13, 2015

(65) Prior Publication Data
US 2015/0215231 A1 Jul. 30, 2015

(30) Foreign Application Priority Data

Jan. 26, 2014 (CN) .......................... 2014 1 0037628

(51) Int. Cl.
| | |
|---|---|
| *G06F 15/16* | (2006.01) |
| *H04L 12/911* | (2013.01) |
| *H04L 29/08* | (2006.01) |
| *H04L 12/703* | (2013.01) |
| *H04L 12/721* | (2013.01) |

(Continued)

(52) U.S. Cl.
CPC ....... *H04L 47/783* (2013.01); *H04L 29/08072* (2013.01); *H04L 45/02* (2013.01); *H04L 45/14* (2013.01); *H04L 45/28* (2013.01); *H04L 47/70* (2013.01); *H04L 67/1097* (2013.01); *H04L 67/2842* (2013.01); *H04L 45/64* (2013.01)

(58) Field of Classification Search
CPC .......................... H04L 29/06; H04L 29/08072
USPC .................. 709/220, 224, 227, 228; 370/217
See application file for complete search history.

(56) References Cited

U.S. PATENT DOCUMENTS

| | | |
|---|---|---|
| 8,448,238 B1 | 5/2013 | Gupta et al. |
| 8,489,673 B2 | 7/2013 | Sebastian et al. |

(Continued)

OTHER PUBLICATIONS

Choongul Park, et al., "The Concept and realization of context-based content delivery of NGSON," Next Generation Service, Overlay Networks (NGSON), IEEE Communications Magazine, vol. 50, Issue 1, Jan. 2012, pp. 74-81.

(Continued)

*Primary Examiner* — Khanh Dinh
(74) *Attorney, Agent, or Firm* — Cantor Colburn LLP; Keivan Razavi

(57) ABSTRACT

A method for processing a resource access request in a network based on a software defined network (SDN) protocol includes receiving a resource access request forwarded by a first SDN switch in the network, wherein there exists no forwarding rule matching the resource access request in the first SDN switch; obtaining, according to the resource access request, resource server information of a resource server where the requested resource is stored, wherein the resource server is located in the network; generating a forwarding rule corresponding to the resource access request according to the resource server information; and sending to the first SDN switch at least one portion of the forwarding rule corresponding to the resource access request, so that the first SDN switch forwards the resource access request according to the at least one portion of the forwarding rule.

6 Claims, 5 Drawing Sheets

(51) Int. Cl.
*H04L 12/751* (2013.01)
*H04L 12/715* (2013.01)

(56) References Cited

U.S. PATENT DOCUMENTS

| | | | |
|---|---|---|---|
| 8,533,293 B1 | | 9/2013 | Sivasubramanian et al. |
| 9,197,545 B2* | | 11/2015 | Callan ................. H04L 41/0654 |
| 9,231,876 B2* | | 1/2016 | Mir ..................... H04L 43/0829 |
| 9,288,141 B2* | | 3/2016 | Callan ................. H04L 41/0654 |
| 9,306,840 B2* | | 4/2016 | Puttaswamy Naga .. H04L 45/42 |
| 9,350,607 B2* | | 5/2016 | Agarwal ............. H04L 41/0816 |
| 2013/0205030 A1 | | 8/2013 | Richardson et al. |
| 2013/0227166 A1 | | 8/2013 | Ravindran et al. |
| 2013/0227171 A1 | | 8/2013 | Nam et al. |
| 2013/0246588 A1 | | 9/2013 | Borowicz et al. |
| 2014/0089506 A1* | | 3/2014 | Puttaswamy Naga .. H04L 45/42 |
| | | | 709/225 |
| 2014/0112130 A1* | | 4/2014 | Yang ....................... H04L 49/25 |
| | | | 370/230 |

OTHER PUBLICATIONS

M.K. Shin, et al. "CDNI Request Routing With SDN, Draft-Shin-CDNI-Request-Routing-SDN-00," Network Working Group, Internet-draft, Jul. 1, 2012, pp. 1-9.

\* cited by examiner

PROCESSING RESOURCE ACCESS REQUEST IN NETWORK

This application claims priority to Chinese Patent Application No. 201410037628.9, filed Jan. 26, 2014, and all the benefits accruing therefrom under 35 U.S.C. §119, the contents of which in its entirety are herein incorporated by reference.

BACKGROUND

The present invention relates to resource access requests, and more specifically, to a method and system for processing a resource access request in a network.

In current intranet networks like an enterprise network, a campus network and so on, there exists a growing conflict between user demands for data distribution and actual capabilities of a network. For example, the amount of files stored and forwarded in a network gets increasingly huge, and users expect a wider transmission bandwidth so as to ensure a faster transmission speed. However, as infrastructure is upgraded slowly and user demands vary dynamically, there might exist one impulse-type user demand for obtaining network resources in a short time, and also there might exist continuous access demands for some network resources in a time period. In this case, it is hard to satisfy users' data access demands with existing network architecture.

SUMMARY

According to one embodiment of the present invention, there is provided a method for processing a resource access request in a network based on a software defined network (SDN) protocol, comprising: receiving a resource access request forwarded by a first SDN switch in the network, wherein there exists no forwarding rule matching the resource access request in the first SDN switch; obtaining, according to the resource access request, resource server information of a resource server where the requested resource is stored, wherein the resource server is located in the network; generating a forwarding rule corresponding to the resource access request according to the resource server information; and sending to the first SDN switch at least one portion of the forwarding rule corresponding to the resource access request, so that the first SDN switch forwards the resource access request according to the at least one portion of the forwarding rule.

According to another embodiment of the present invention, there is provided a system for processing a resource access request in a network based on a software defined network (SDN) protocol, comprising: a transmission module configured to receive a resource access request forwarded by a first SDN switch in the network, wherein there exists no forwarding rule matching the resource access request in the first SDN switch; a content management module configured to obtain, according to the resource access request, resource server information of a resource server where the requested resource is stored, wherein the resource server is located in the network; a forwarding management module configured to generate a forwarding rule corresponding to the resource access request according to the resource server information, wherein the transmission module is further configured to send to the first SDN switch at least one portion of the forwarding rule corresponding to the resource access request, so that the first SDN switch forwards the resource access request according to the at least one portion of the forwarding rule.

By means of the embodiments of the present invention, network users' resource accessing can be accelerated efficiently.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
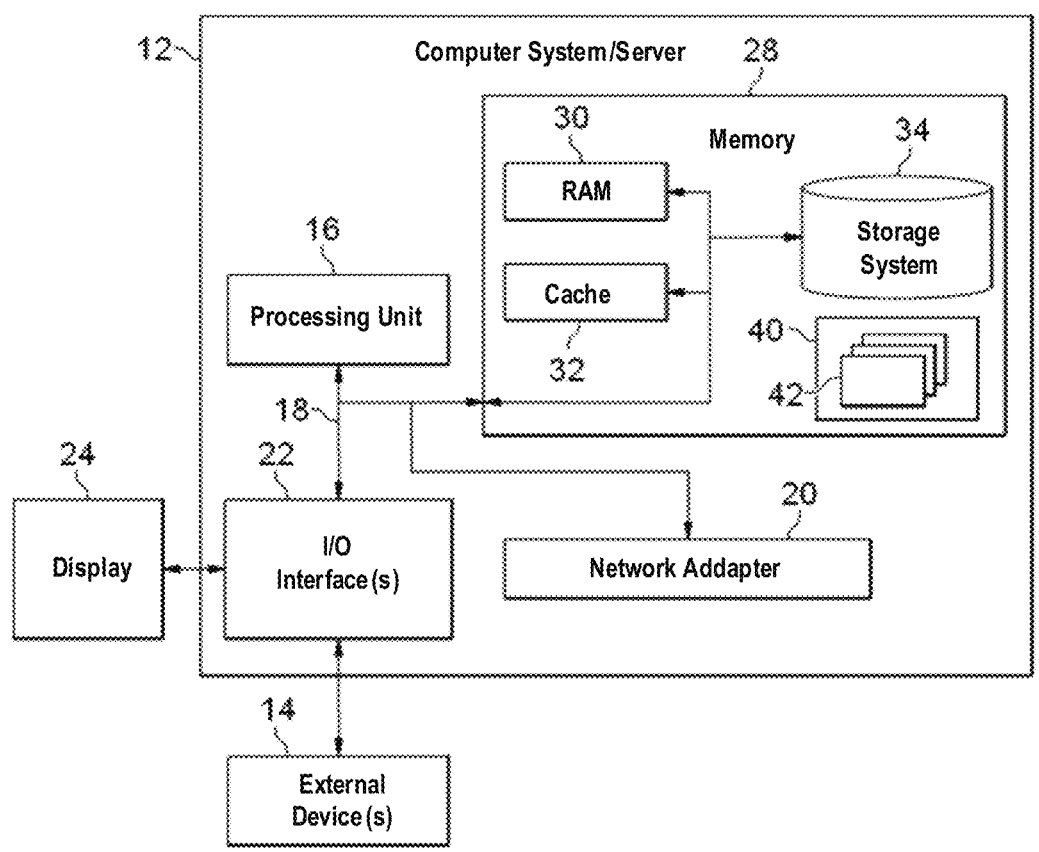
FIG. 1 shows an exemplary computer system/server 12 which is applicable to implement the embodiments of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as portion of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the above discussed drawbacks, it is desired to provide a solution capable of accelerating network resource accessing.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems, etc.

Inventors of the present invention find that in a local area network like an enterprise network or a campus network, network traffic has some features specific to this enterprise network or campus network. For example, when the CEO of an enterprise presents an important speech, there are huge number of downloads of and accesses to the speech video among users within this enterprise network; for a specific team, some software or application needs to be downloaded and installed by everyone, which also leads to huge concentrated accesses to the software or application, etc. Therefore, if a network-wide observation is capable, such requests are predictable to some extent. The predictability helps network administrators to make deployment in advance and download some hot resources to resource servers within this enterprise network for caching, thereby helping to accelerate network resource accessing.

For example, if it is found more than 10% machines have accessed a certain resource in 30 minutes, then it may be judged this resource is a hot resource at a high probability. Or if recently there are many requests for virtual machine images, then more files of this type may be cached in a resource server.

Note although an enterprise network is taken here as an example to illustrate various embodiments of the present application, those skilled in the art may understand the embodiments of the present application are not limited to an enterprise network but may be applied to other local area network or intranet having similar characteristics, such as a campus network, a data center network, a net bar, etc.

To achieve the management of resource access requests, SDN architecture based on a software defined network (SDN) protocol is used here for implementing the embodiments of the present invention.

SND is a novel network innovation architecture, which splits control functionality from network switch equipment and immigrates it to a logically independent network control system, thereby achieving flexible control of network traffic. The control system may run on a general-purpose server, and any user can program control functionality at any time, so that control functionality is no longer confined in a router. Moreover, the control system provides a set of APIs via which users can monitor, manage and maintain the control system.

Therefore, in an SDN network there are a logic control layer and a device layer. The control layer is a portion that makes forwarding decisions in the data network, comprising management, routing protocol, routing policy, etc. The device layer comprises query, exchange and cache with respect to each packet, e.g., comprising switches (SDN switches) supporting a SDN protocol (e.g., Openflow protocol).

SDN provides great flexibility for network design, planning and management; users can develop various application programs, and logic network topology is defined by software so as to satisfy different demands for network resources, without caring physical topological structure of the underlying network.

Figure 2:
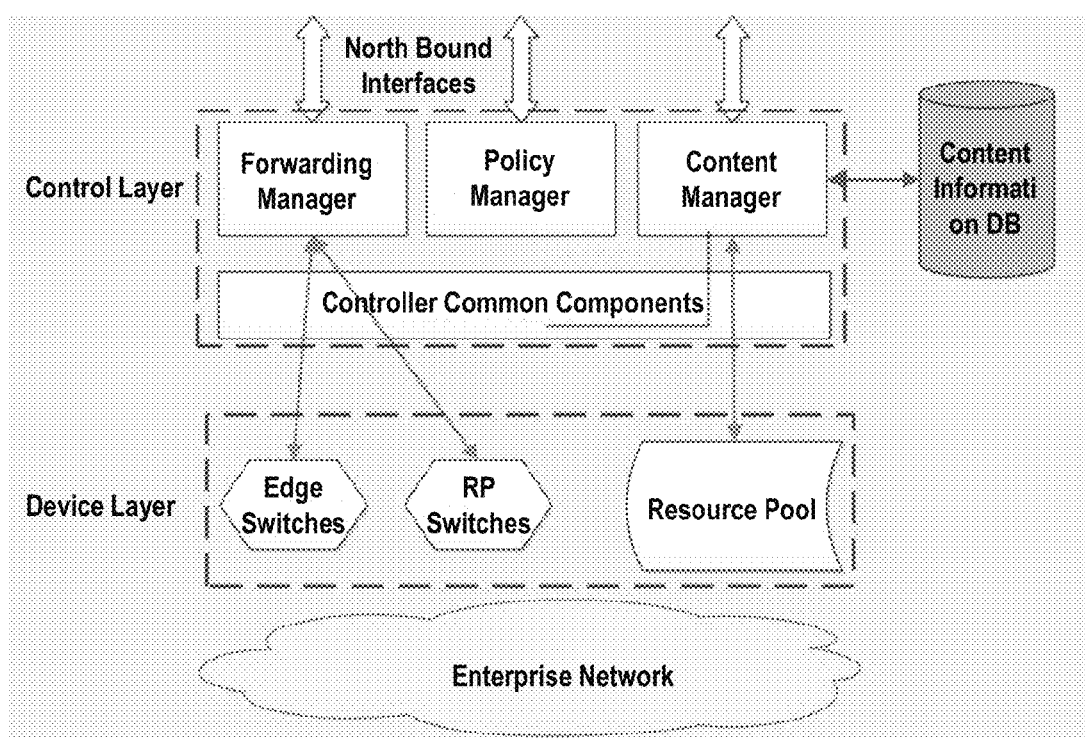
FIG. 2 shows a schematic view of system architecture of an enterprise network based on a SDN protocol according to one embodiment of the present invention.

FIG. 2 shows a schematic view of system architecture of an enterprise network based on a SDN protocol according to one embodiment of the present invention.

As seen from FIG. 2, the architecture comprises two layers, namely a device layer and a control layer. The device layer may comprise SDN switches supporting a SDN protocol, such as edge switches connecting users, resource pool switches (RP switches) connecting a resource pool, or any switches based on a SDN protocol between edge switches and RP switches. The resource pool may comprise resource servers for caching resources within the enterprise network. These resource servers also belong to one portion of the device layer.

According to one embodiment of the present invention, besides traditional components supporting SDN, the control layer may further comprise a forwarding manager and a content manager. The forwarding manager is used for managing request forwarding. The content manager manages contents of the resource pool. In addition, the control layer may further comprise a policy manager for providing a requested forwarding policy.

A brief introduction is given below to the workflow of SDN by taking data stream forwarding as an example. In SDN, SDN switches need to forward packets according to forwarding rules given by the control layer. When a SDN switch receives the first packet of the data stream, since in the SDN switch locally there is no forwarding rule about the packet, the SDN switch has to forward the packet to the control layer so as to obtain a corresponding forwarding rule from the control layer and store it to a local flow table. Afterwards, when the SDN switch receives a next packet of the same data stream, the SDN switch compares address information of the packet with rule information in the local flow table. If a consistent entry is found, then the SDN switch forwards the packet according to rule information in the flow table. In this procedure, the control layer only needs to perform routing computation with respect to the first packet of each stream and store the result in a local flow table of the switch, and then subsequent decision is implemented by looking up the local flow table, thereby improving the forwarding efficiency.

Figure 3:
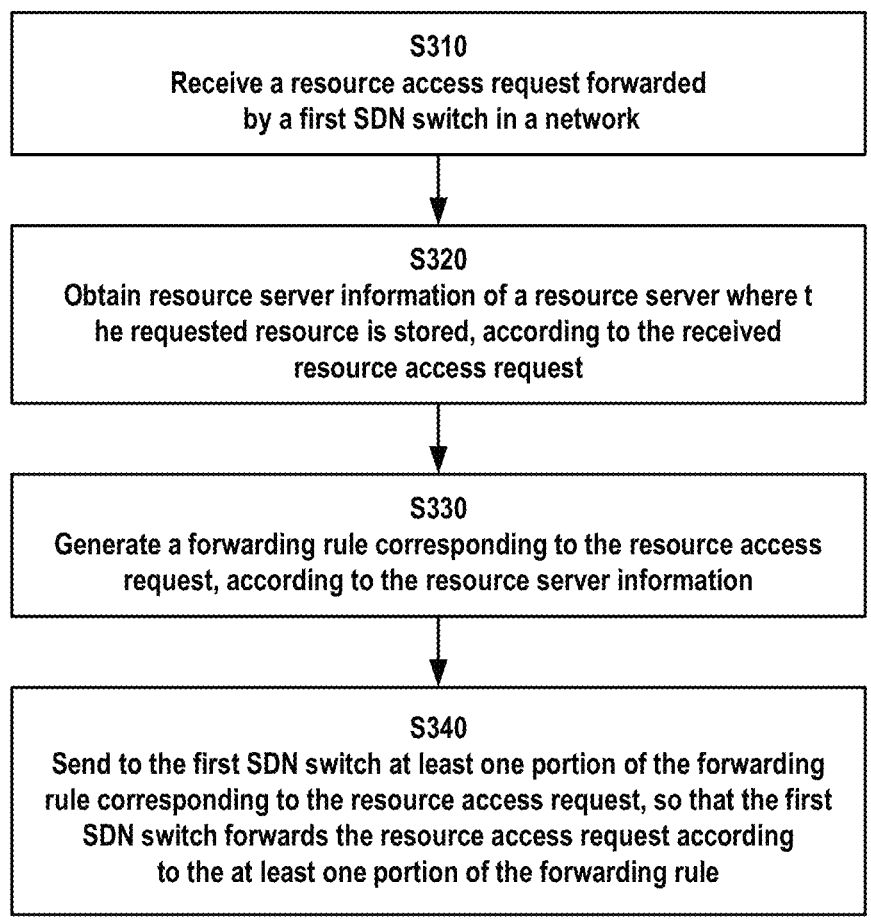
FIG. 3 shows a flowchart of a method for processing a resource access request according to one embodiment of the present invention.

With reference to a flowchart shown in FIG. 3, illustration is presented below to a process flow of the control layer according to one embodiment of the present invention.

In block S310, the control layer receives a resource access request forwarded by a first SDN switch in a network, wherein in the first SDN switch there exists no forwarding rule matching the resource access request.

The resource access request may be a request for resources either outside or inside an enterprise network.

According to one embodiment of the present invention, the first SDN switch may be an edge switch in the network or any other switch in the network. As mentioned above, the edge switch is a switch directly connected to with users. Under a SDN protocol, the edge switch, upon receiving a resource access request from a user, first checks whether or not there is a forwarding rule matching the request in the edge switch. If no forwarding rule matching the request is found, then the edge switch forwards the request to the control layer.

In block S320, the control layer, according to the received resource access request, obtains resource server information of a resource server where requested resources are stored, wherein the resource server is located in the enterprise network and is connected with other switch in the network via a RP switch. This operation may be implemented by a content manager in the control layer.

According to one embodiment of the present invention, the content manager can maintain a content table, which contains information related to resources stored within the enterprise network, such as information of a resource server where requested resources are stored.

In block S330, the control layer generates a forwarding rule corresponding to the resource access request according to the resource server information. This operation may be implemented by a forwarding manager in the control layer.

According to one embodiment of the present invention, the forwarding manager, according to learned network topology information and the information of a resource server where requested resources are stored, can determine a forwarding path from the first SDN switch to the resource server, and then generate a corresponding forwarding rule according to the forwarding path.

In block S340, the control layer sends to the first SDN switch at least one portion of the forwarding rule corresponding to the resource access request, so that the first SDN switch can forward the resource access request according to the at least one portion of the forwarding rule.

The forwarding rule generated in block S330 may comprise forwarding rules of various SDN switches on the forwarding path from the first SDN switch to the resource server, so in block S340, only a forwarding rule associated with the first SDN switch is sent to the first SDN switch.

Thus, with respect to an access request, submitted by an enterprise network user, for resources on a network outside the enterprise network, if it is determined the resources have been saved on a server inside the enterprise network, then the request may be directly forwarded to the server inside the enterprise network, whereby access to the resources is accelerated. Those skilled in the art may understand the embodiments of the present invention are also applicable to requests for resources inside the enterprise network. For example, when an employee in China wants to access resources on an American server, if the content manager finds the resources are already stored on a resource server located in China, then according to the method described above, the resource access request for resources on the American server is forwarded to the resource server located in China for responding to the request, whereby the response speed is accelerated.

To finally forward the resource access request to a corresponding resource server, each switch on the forwarding path from the first SDN switch to the resource switch needs to perform forwarding according to the forwarding rule generated by the control layer. At this point, different implementations may be used to send to the corresponding switch the forwarding rule generated by the control layer.

For example, after the control layer generates the forwarding rule, the forwarding rule or at least one portion thereof is proactively sent to respective second SDN switches on the forwarding path from the first SDN switch to the resource server. Thus, after receiving the resource access request forwarded from the preceding switch, these switches can forward this request according to the corresponding forwarding rule until the request reaches the resource server. In this manner, when respective second SDN switches receive a packet about the resource access request, they do not have to wait for the control layer to perform processing, thereby greatly shortening the forwarding latency.

Or the control layer, after generating the forwarding rule, sends the forwarding rule only to an SDN switch from which the resource access request comes. Where the first SDN switch forwards the resource access request to a second SDN switch on the forwarding path, the second SDN switch first checks whether or not there exists a forwarding rule matching the request in the second SDN switch. If no matched forwarding rule is found, the second SDN switch then forwards the request to the control layer.

The control layer, after receiving the resource access request forwarded by the second SDN switch, sends at least one portion of the forwarding rule corresponding to the resource access request to a second SDN switch so that the second SDN switch forwards the resource access request according to the rule. An advantage of such processing is although the second SDN switch has to obtain the forwarding rule from the control layer when receiving the request, the storage requirement on switches is reduced.

Note the second switch mentioned here not only refers to a switch connected with the first switch, but may comprise any switch on the forwarding path from the first switch to the resource server, so there might exist more than one second switch.

In above block S320, a resource server to be accessed may be determined according to a predefined policy provided by a policy manager in the control layer. For example, it is found by querying the content table that more than two resource servers contain to-be-accessed resources, whereas the policy manager indicates a resource server with less accesses is to be accessed in order to maintain a load balance, so it is determined according to records in the content table that the resource server with less accesses is accessed. This policy may be predetermined or dynamically modified in real time so as to flexibly adapt to different demands of network users.

Moreover, in this flow resources to be cached to a resource server in the network may be determined according to the predetermined policy, so that resources may be cached to the resource server in advance, and the resources together with related information of the resource server storing the resources are stored in the content table. For example, if it is found that accesses of enterprise network users to a specific resource on the Internet soar in a specific time period, it is predicted that access demands on the resource will keep increasing in a future time period, then at this point the resource is downloaded to the resource server and related information is stored in the content table. Thus, when receiving a further access request for the resource from enterprise network users, by querying the content table, a resource server storing the resource may be found, and further the access to the Internet changes to the access to the resource server inside the enterprise network, thereby effectively accelerating users' resource retrieval.

As introduced above, the content manager may maintain a content table. For example, a content metadata DB may be located either inside or outside the content manager. The content table is used for recording resource statistics of the resource pool. Table 1 below shows an example of the content table.

TABLE 1

Example of Content Table

| Request | RP_ID | Recent Hit | Sum Hit | Age (s) | Timeout (s) |
|---|---|---|---|---|---|
| ibm.com/geni_talk.mp4 | 0x01 | 100 | 1000 | 1800 | 3600 |
| ibm.com/other_resource | 0x02 | 200 | 2000 | 2000 | 3600 |
| ... | ... | ... | ... | ... | ... |

Wherein the Request field stores a resource name as a keyword, which is usually a URL.

RP_ID is resource server ID, which stores ID of a resource server having a requested resource. The field may contain more than one server ID, which means that the resource may exist in multiple resource servers at the same time. The control layer implements a load balance to determine which resource server to be accessed.

Recent Hit and Sum Hit record the number of hits. If more than one server provides the same resource, then the control layer may use the number of hits as a basis for load balance.

The Age field records how long the content has stayed on the resource server.

The Timeout field is used for indicating how often content in the resource pool should be refreshed. When the age of a resource reaches timeout, the resource should be updated from the original server.

Note above description of the content table is merely exemplary. Those skilled in the art may further take different content table forms and include different field information to the content table, according to concrete applications and different policies.

With reference to a schematic view shown in FIG. 4 and by taking an enterprise network as an example, description is presented below a schematic view of a concrete example of a process flow with respect to a resource access request inside the enterprise network.

First of all, as shown by arrow 1, the edge switch receives from a user a resource access request for accessing a certain resource on the Internet. As shown in this figure, a source IP address of the request is 192.168.0.2 and located inside the enterprise network; a destination IP address of the to-be-accessed resource is 99.34.56.14, which indicates an IP address outside the enterprise network.

The edge switch, by checking a header of the request packet for example, tries to match the packet to internal rules of the edge switch. If a matched rule is found, then the edge switch forwards the request according to the rule, just as shown by arrow 4. If no matched rule is found, then as shown by arrow 2, the edge switch sends the request to the control layer.

The control layer checks the content table according to the requested resource. If the content table does not contain any information related to the requested resource, then "forward-to-Internet" rules are generated. At this point, the edge switch, acting as a traditional switch, forwards the request to a correct port which finally reaches the Internet gateway, and the resource is accessed from the Internet.

If the content table contains information related to the requested resource, then "forward-to-resource pool" rules are generated according to a different policy, and by arrow 3 the generated rules are sent to the edge switch. For example, the forwarding rule sent to the edge switch may be "SrcIP=192.168.0.2, dstIP=99.34.56.14, OUTPUT:port 2", wherein "SrcIP=192.168.0.2" indicates a source IP of the request is 192.169.0.2, which is located inside the enterprise network; "dstIP=99.34.56.14" indicates a destination IP of the request is 99.34.56.14, which indicates an IP address outside the enterprise network; "OUTPUT:port 2" indicates the request is to be outputted from port 2 of the switch.

The edge switch forwards the request according to the matched rule; if the rule indicates the request should be forwarded to the resource pool, then as shown by arrow 4, the edge switch follows the rule to forward the request to the RP switch. If other switch also exists on the path from the edge switch to the RP switch, then the edge switch follows the rule to forward the request to the other switch. Similarly, the switch may obtain from the control layer forwarding rules "srcIP=192.168.0.2, dstIP=99.34.56.14, OUTPUT: port 3" and send the request from port 3 according to the rules.

After receiving the request, the RP switch checks its internal rules; if matched rules are found, then the request is forwarded to a corresponding resource server, just as shown by arrow 7. If no matched rules are found, then the RP switch sends the request to the control layer, as shown by arrow 5.

The control layer checks the content table so as to obtain information of a resource server to which the request should be sent, such as ID of the resource server, generates forwarding rules for the RP switch, and sends generated rules to the RP switch by arrow 6.

For example, forwarding rules for the RP switch connected with the resource server may be "srcIP=192.168.0.2, dstIP=99.34.56.14, newDstIP=192.168.100.1, OUTPUT: port 4." Wherein "newDstIP=192.168.100.1" represents a new destination IP address, indicating an IP address of a resource server where the resource is located. Why this new destination IP address is needed is that a server only processes requests whose destination IP addresses are the server address, so it is necessary to replace the request's destination IP address 99.34.56.14 with the resource server's IP address 192.168.100.1 at the RP switch, so as to obtain a response of the resource server.

At arrow 7, the resource server sends the request to a resource server inside the resource pool according to the received rule. At arrow 8, the server replies a response to the RP switch. At this point, the response's source IP address is the resource server's IP address 192.168.100.1, and the destination IP address is 192.168.100.1.

According to the forwarding rule obtained by arrow 6 or the rule obtained from the control layer, the RP switch modifies the response, i.e., replaces the resource server's IP address with the previous external IP address, and sends the response to the edge switch by arrow 9.

The edge switch sends the response to a client by arrow 10.

In this manner, the request which used to access a resource on an external website is forwarded to a server inside the enterprise network, thereby efficiently improving user access speed.

Moreover, by using the forwarding rule to process the header of the request packet forwarded by the switch, the header is replaced with information of the resource server so as to obtain resources from the resource server, and after a response is returned, the header is restored according to the rule of the control layer. Finally the response reaches the user. Therefore, this process is transparent to the user, just as the user accesses the original website.

Figure 4:
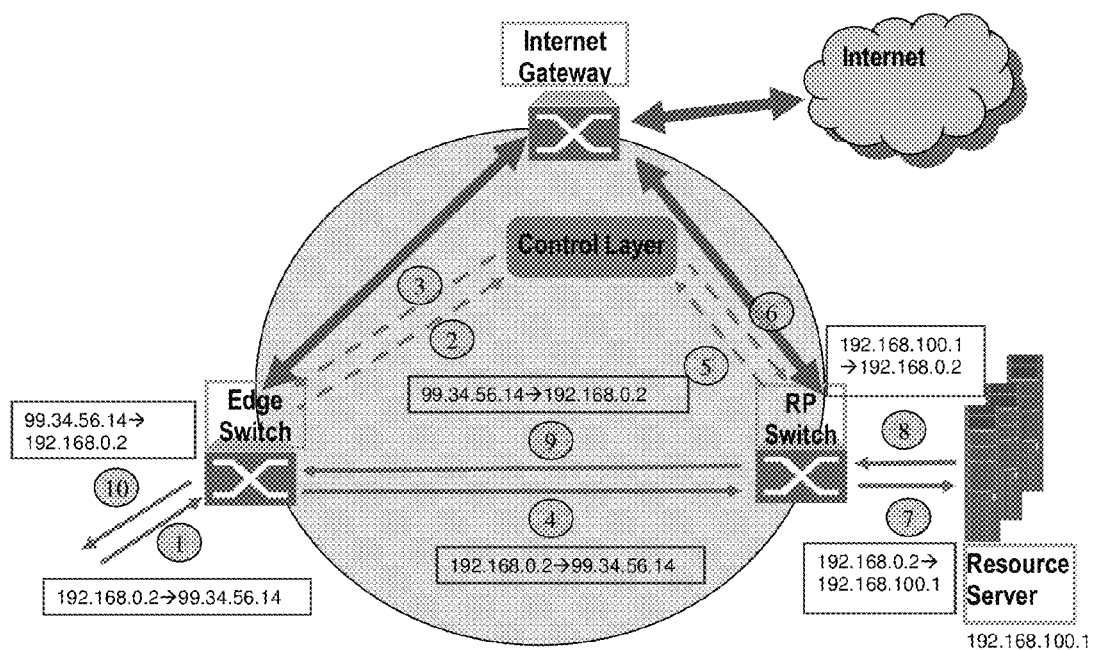
FIG. 4 shows a schematic view of a flow for processing a resource access request according to one embodiment of the present invention.

In the flow shown in FIG. 4, corresponding rules on the RP switch may be calculated when the edge switch accesses the control layer. Thus, steps 5 and 6 in FIG. 4 are not needed. Moreover, if a large file needs to be downloaded, then the request is divided into multiple packets, steps 2 and 3 are executed for the first packet only but not executed for subsequent packets, for the subsequent packets forwarding is performed directly according to forwarding rules in the edge switch.

Figure 5:
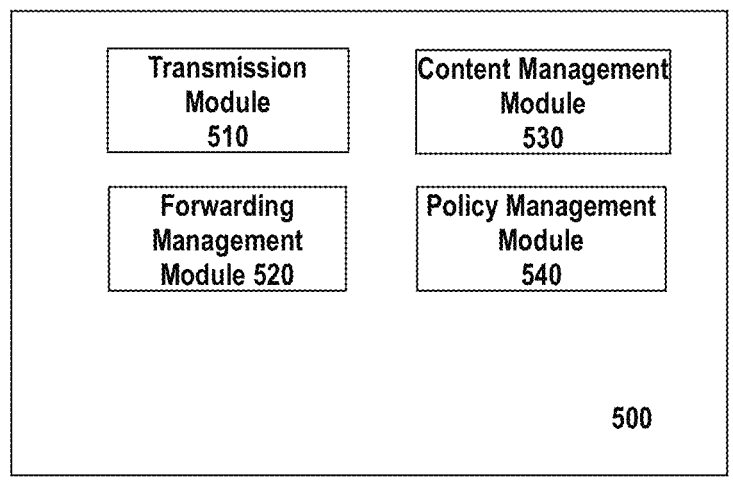
FIG. 5 shows a block diagram of a system for processing a resource access request according to one embodiment of the present invention.

With reference to FIG. 5, description is presented below to a block diagram of a control system where one embodiment of the present invention is implemented. Control system 500 may comprise a transmission module 510, a content management module 520 and a forwarding management module 530.

According to one embodiment of the present invention, transmission module 510 is configured to receive a resource access request forwarded by a first SDN switch in a network, wherein there exists no forwarding rule matching the resource access request in the first SDN switch. Content management module 520 is configured to obtain, according to the resource access request, resource server information of a resource server where the requested resource is stored, wherein the resource server is located in the network. Forwarding management module 530 is configured to generate a forwarding rule corresponding to the resource access request according to the resource server information. Transmission module 510 is further configured to send to the first SDN switch at least one portion of the forwarding rule corresponding to the resource access request, so that the first SDN switch forwards the resource access request according to the at least one portion of the forwarding rule.

According to one embodiment of the present invention, forwarding management module 530 is further configured to: determine a forwarding path from the first SDN switch to the resource server according to network topology information and the resource server information; and generate a forwarding rule corresponding to the resource access request according to the forwarding path.

According to one embodiment of the present invention, transmission module 510 is further configured to send to at least one second SDN switch at least one portion of the forwarding rule corresponding to the resource access request, so that the at least one second SDN switch forwards the resource access request according to at least one portion of the forwarding rule, wherein the at least one second SDN switch is located on a forwarding path from the first SDN switch to the resource server.

According to one embodiment of the present invention, transmission module 510 is further configured to: receive a resource access request forwarded by at least one second SDN switch, wherein the at least one second SDN switch is located on a forwarding path from the first SDN switch to the resource server. Forwarding management module 530 is configured to obtain the generated forwarding rule corresponding to the resource access request. Transmission module 510 is further configured to send to at least one second SDN switch at least one portion of the forwarding rule corresponding to the resource access request, so that the at least one second SDN switch forwards the resource access request according to at least one portion of the forwarding rule.

According to one embodiment of the present invention, resource server information of the resource server storing the requested resource is stored in a content table.

According to one embodiment of the present invention, control system 500 further comprises a policy management module 540 configured to provide a requested forwarding policy. And according to one embodiment of the present invention, policy management module 540 may be further configured to determine, according to the predetermined policy, a resource to be cached to a resource server in the network. And content management module 520 is configured to cache the determined resource to the resource server.

The forwarding management module, the content management module and the policy management module each can support an API for the user so that the user can configure these management modules via the API and some information may be displayed to the user. The user may specify some management policies about the resource pool, for example, may formulate policies according to the recent access time, access counts, file type and so on.

Note although the embodiments of the present invention are illustrated here by taking an enterprise network user's access to a resource on the Internet as an example, various aspects of the present invention are not limited to access to resources on the Internet. For example, the present invention is also applicable to access of uses in different areas to resources inside an enterprise network. To take an example, for employees with the same enterprise but working across the world, if it is predicted or detected there is a demand among employees in China for huge number of accesses to resources on a US server, then by means of the method of the embodiment of the present invention, the resources may be cached to the locality for accelerating access.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for processing a resource access request in a network based on a software defined network (SDN) protocol, comprising:
 a processor coupled to a memory configured to perform a method comprising:
 receiving a resource access request forwarded by a first SDN switch in the network, wherein there exists no forwarding rule matching the resource access request in the first SDN switch;

obtaining, according to the resource access request, resource server information of a resource server where the requested resource is stored, wherein the resource server is located in the network;

generating a forwarding rule corresponding to the resource access request according to the resource server information wherein the forwarding rule comprises a forwarding path to the resource server, and wherein the forwarding path comprises one or more SDN switches between the first SDN switch and the resource server, sending to the first SDN switch at least one portion of the forwarding rule corresponding to the resource access request, so that the first SDN switch forwards the resource access request according to the at least one portion of the forwarding rule; and sending to the one or more SDN switches in the forwarding path at least one portion of the forwarding rule corresponding to the resource access request, so that the one or more SDN switches in the forwarding path forwards the resource access request according to the at least one portion of the forwarding rule.

2. The system according to claim 1, further comprising the processor configured to:

determine a forwarding path from the first SDN switch to the resource server according to network topology information and the resource server information; and generate the forwarding rule corresponding to the resource access request according to the forwarding path.

3. The system according to claim 2, further comprising the processor configured to:

send to at least one second SDN switch at least one portion of the forwarding rule corresponding to the resource access request, so that the at least one second SDN switch forwards the resource access request according to the forwarding rule, wherein the at least one second SDN switch is located on the forwarding path from the first SDN switch to the resource server.

4. The system according to claim 2, further comprising the processor configured to:

receive a resource access request forwarded by at least one second SDN switch, wherein the at least one second SDN switch is located on the forwarding path from the first SDN switch to the resource server; and send to the at least one second SDN switch at least one portion of the forwarding rule corresponding to the resource access request, so that the at least one second SDN switch forwards the resource access request according to the at least one portion of the forwarding rule.

5. The system according to claim 2, wherein the resource server information of the resource server storing the requested resource is stored in a content table.

6. The system according to claim 2, further comprising: the processor configured to determine, according to a predetermined policy, a resource to be cached to a resource server in the network, and cache the determined resource to the resource server.

* * * * *